UNITED STATES PATENT OFFICE.

EDWARD D. MARSHALL, OF CEDAR RAPIDS, IOWA.

HAIR-TONIC.

No. 915,781.  Specification of Letters Patent.  Patented March 23, 1909.

Application filed June 1, 1907. Serial No. 376,787.

*To all whom it may concern:*

Be it known that I, EDWARD D. MARSHALL, a citizen of the United States, residing at Cedar Rapids, in the county of Linn and State of Iowa, have invented a new and useful Improvement in Hair-Tonics, of which the following is a specification.

This invention relates to a remedy for baldness, the object being to restore the hair by combining in one preparation certain curative elements which will have a beneficial effect upon the scalp and upon the hair and this compound is prepared in the following manner:—

My compound consists of equal parts of elderberry bark, *Sambucus Canadensis;* crab apple tree bark, or leaves, *Pyrus coronaria;* leaves of sheep sorrel, *Rumex acetosella;* leaves of nightshade, *Belladonnæ folia;* boneset, *Eupatorium;* leaves of the morning glory, *Ipomæa purpurea;* wild sage, *Salvia;* and horse radish, *Cochlearia armoracia.* In preparing the compound the leaves of these plants are taken or as above stated, bark of the crab apple and elder may be used instead of the leaves. They are all placed in water and boiled and after boiling a sufficient length of time to extract all of the medicinal properties from the ingredients which can be obtained by steady boiling, the liquid thus obtained is added to olive oil in the proportion of from five to six quarts of the liquid to one quart of the oil. Usually about one-half hour boiling is required before straining off and mixing. After adding the five or six quarts of the liquid to the olive oil, it is allowed to simmer for about one hour or until the water has evaporated. It is then poured into jars and permitted to cool before sealing, the preparation thickening as it cools. It is applied externally to the scalp, the elder bark or leaves being healing to the scalp, the crab apple bark or leaves preventing falling out of the hair still remaining and also rendering it flexible preventing it becoming harsh and breaking off, the sheep sorrel removes dandruff, the night shade opens up the pores and starts the hair to grow. The sage is cooling to the scalp and the olive oil forms the body of the preparation.

To make one quart of the finished product requires one-half an ounce of each of the above named ingredients, other than the olive oil.

Having thus fully described my invention, what I claim as new and desire to secure by Letters Patent, is:—

A hair tonic consisting of an intimate mixture of olive oil with an aqueous extract of the leaves of elder, crab apple, morning glory, night shade, wild sage, horseradish, boneset, and sheep sorrel, in substantially the described proportions.

EDWARD D. MARSHALL.

Witnesses:
C. S. SMITH,
T. E. RAVENSCROFT.